Patented July 24, 1923.

1,462,563

UNITED STATES PATENT OFFICE.

ARTHUR G. VOLTZ, OF CLEVELAND, OHIO.

METHOD OF LUBRICATING RUBBER MOLDS.

No drawing.   Application filed January 19, 1922.   Serial No. 530,436.

*To all whom it may concern:*

Be it known that I, ARTHUR G. VOLTZ, a citizen of the United States, residing at Cleveland, in the county of Cuyahoga and State of Ohio, have invented a certain new and useful Improvement in a Method of Lubricating Rubber Molds, of which the following is a full, clear, and exact description, reference being had to the accompanying drawings.

This invention is concerned with the manufacture of rubber articles and is more particularly directed to improving the method of lubricating rubber molds.

The general object of my invention is the provision of a lubricant for lubricating the molding surfaces of rubber molds whereby the molded rubber article may be quickly and readily removed from the mold after having been cured therein.

A further object is the provision of a lubricant for treating the mold surfaces of rubber molds whereby the articles being molded and cured therein may have a highly glossed surface which will also reflect the true color of the rubber composition from which the article is formed.

An additional object is the provision of a novel method of treating rubber mold surfaces with a lubricant which prevents sticking of the molded articles to the molds after the curing operation has been completed.

Other objects of my invention will be summarized in the claims.

In the art of molding rubber articles, it has been the practice heretofore to construct the molds of metal. The contour of the article to be molded was formed in the metal and the mold surfaces were usually treated with powdered soap stone or talcum before the rubber was placed therein. The soap stone served as a partition medium between the rubber and the molding surfaces of the mold when the subsequent curing or vulcanizing operation was performed on the compressed rubber.

Such a method of treating the mold was objectionable in that the molded and cured articles frequently adhered to the mold surfaces and were destroyed by the efforts of the operator to remove them. A large percentage of the manufacturing waste has always been caused in the molding operations, as no suitable method of treating the molds has heretofore been available which would overcome this difficulty of adherence without introducing many new disadvantages.

I have found, however, that by spraying the mold surfaces with a liquid composed of a mixture of ingredients such as will be hereinafter set forth, produces a highly desirable effect upon the molded surfaces of the rubber article, in that the true color of the product is definitely brought out and furthermore the product has a high degree of smoothness which prevents adhesion of the rubber to the mold, thus permitting the operator or rubber molder to remove the molded articles from the mold cavities without marring or destroying them.

The mixture is in the nature of a lubricant and is such that a lubricating effect is obtained which greatly increases the flowing quality of the rubber when the latter is being compressed in the molds and also serves to fill any small voids or irregularities in the surfaces of the mold; there being a slight residue of hardened matter deposited on the mold after each operation which eventually gives the molding surfaces the appearance of having been coated with glass or enamel. The idea of treating a rubber mold to obtain a glazed molding surface on the mold and a gloss finish on the rubber article molded thereby is disclosed in detail in my copending application, Serial No. 624,266, filed March 10, 1923.

Furthermore, I find that I also obtain glossed surfaces on the molded articles; a desirable feature which has been unobtainable heretofore without incurring the liability of a cracking or checking of the rubber.

The preferred form of my lubricant comprises a mixture of a commercial laundry soap, or sodium stearate (which is substantially free from alkali or alkali compounds and which should not have other foreign or impure substances exceeding 1 or 2 per cent); a small quantity of a suitable neutral salt, formed by the combination of a base and an acid, as for instance borax; an ammonium compound and water.

Ten ounces of solid soap may be mixed in 1 gallon of water and the mixture may be maintained at a boiling temperature until the soap has dissolved. Then 2½ ounces of borax may be added to the mixture of the soap and water above designated, and after the mixture has cooled from 2 to 20 ounces of a concentrated ammonium salt solution may be added. The mixture may then be agitated until an emulsified mass is obtained. About an ounce of sodium chloride or equivalent salt in solid form may then be added to the lubricant.

A lubricant having the constituents above set forth will be of an oily, thick consistence which may be sprayed through an atomizer of any convenient construction, such for instance as is commonly used in spraying insecticides.

If it is desired, an equivalent lubricant may be obtained by boiling stearin and water in the proportion described in reference to the soap and water mixture which will result in the formation of glycerol and stearic acid. Sodium hydroxide may then be added to the stearic acid resulting in the formation of sodium stearate or common soap. To this mixture sodium borate, ammonia hydroxate and sodium chloride may then be added in the quantities already set forth and the resulting mixture agitated until emulsification takes place.

Oleic acid may be added to the water in place of the soap and in the same quantity by weight. The quantities of the other ingredients may be slightly increased, namely; to the extent of an ounce, and the resulting saponified mixture will also comprise a suitable rubber mold lubricant.

The decomposing action of the ammonium salts when in the mold under temperature creates the formation of a film of free gas which is under pressure between a film of grease deposited on the mold surfaces and the surfaces of the rubber article being molded, resulting in a glossing or extraordinary smoothing of the rubber surfaces.

In any of the above outlined compositions, or other equivalents, which may be employed for the purpose, the use of a compound which will liberate a gas at a rubber vulcanizing temperature will give the described result.

Having thus described my invention, I claim:

1. The method of lubricating a rubber mold which includes the steps of preparing a mixture of stearin boiled in water, adding sodium borate, ammonia hydroxide, and sodium chloride, and spraying the mixture upon the molding surfaces of the mold cavities prior to the filling of the mold cavities with rubber compound.

2. The method of molding rubber articles which includes the step of treating the surfaces of mold cavities with an emulsified mixture of stearin and water and salt and ammonium hydroxide, forcing plastic rubber into contact with the mold surfaces while so lubricated, and subjecting the plastic rubber to a vulcanizing temperature when in contact with said lubricated surfaces, whereby said lubricant will act upon the cured rubber and cause a high gloss effect on said surfaces.

3. The method of lubricating a rubber mold which includes the step of treating the surfaces of the mold cavities with an admixture of soap, water, borax, and a compound which will liberate a gas from the mixture when said mold cavities are heated to a rubber curing temperature.

4. The method of lubricating a rubber mold which includes the steps of preparing a mixture of stearin boiled in water, a neutral salt, an ammonium compound, and sodium chloride, and spraying the mixture upon the molding surfaces of the mold cavities prior to the filling of the mold cavities with rubber compound.

5. The method of molding rubber articles which includes the step of lubricating the surfaces of rubber mold cavities with an emulsified mixture of stearin and water and soluble salts which will liberate a gas at a rubber vulcanizing temperature, forcing uncured rubber into contact with the mold surfaces while so lubricated, and subjecting the rubber to a vulcanizing temperature when in contact with said lubricated surfaces.

In testimony whereof, I hereunto affix my signature.

ARTHUR G. VOLTZ.